US011760355B2

(12) United States Patent
Lewandowski et al.

(10) Patent No.: US 11,760,355 B2
(45) Date of Patent: Sep. 19, 2023

(54) ASSISTANCE BY TOWED VEHICLE

(71) Applicant: Ford Global Technologies, LLC, Dearborn, MI (US)

(72) Inventors: Andrew Denis Lewandowski, Sterling Heights, MI (US); Keith Weston, Canton, MI (US); Brendan F. Diamond, Grosse Pointe, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 17/346,735

(22) Filed: Jun. 14, 2021

(65) Prior Publication Data

US 2022/0396271 A1 Dec. 15, 2022

(51) Int. Cl.
  *B60W 30/18* (2012.01)
  *B62D 12/02* (2006.01)
  *B62D 15/02* (2006.01)
  *B60W 10/04* (2006.01)
  *B60W 10/20* (2006.01)
  *B60W 10/18* (2012.01)

(52) U.S. Cl.
  CPC ...... *B60W 30/18163* (2013.01); *B60W 10/04* (2013.01); *B60W 10/18* (2013.01); *B60W 10/20* (2013.01); *B62D 12/02* (2013.01); *B62D 15/021* (2013.01); *B62D 15/0255* (2013.01); *B60W 2510/0676* (2013.01); *B60W 2510/087* (2013.01); *B60W 2510/244* (2013.01); *B60W 2530/209* (2020.02); *B60W 2552/15* (2020.02); *B60W 2554/4049* (2020.02); *B60W 2710/18* (2013.01); *B60W 2720/106* (2013.01); *B60W 2720/125* (2013.01); *B60W 2720/24* (2013.01)

(58) Field of Classification Search
  CPC ........... B60W 30/18163; B60W 10/04; B60W 10/18; B60W 10/20; B60W 2530/209; B60W 2552/15; B60W 2554/4049; B60W 2510/0676; B60W 2510/087; B60W 2510/244; B60W 2710/18; B60W 2720/106; B60W 2720/125; B60W 2720/24; B62D 12/02; B62D 15/021; B62D 15/0255
  See application file for complete search history.

(56) References Cited

U.S. PATENT DOCUMENTS 8,548,683 B2 * 10/2013 Cebon ................... B62D 13/00
                                                 701/42
8,700,284 B2    4/2014 Wojtkowicz et al.
(Continued)

FOREIGN PATENT DOCUMENTS

JP           11240461 A        9/1999

*Primary Examiner* — Nicholas Kiswanto
*Assistant Examiner* — Jamal A Shah
(74) *Attorney, Agent, or Firm* — Frank A. MacKenzie; Bejin Bieneman PLC

(57) ABSTRACT

A computer includes a processor and a memory storing instructions executable by the processor to receive data indicating a lane change by a first vehicle that is towing a second vehicle, the data including data indicating a direction that first wheels of the first vehicle are turning while the first vehicle is performing the lane change; and during the lane change, instruct a steering system of the second vehicle to turn second wheels of the second vehicle in a same direction as the first wheels.

19 Claims, 6 Drawing Sheets

(56) References Cited

U.S. PATENT DOCUMENTS

| | | |
|---|---|---|
| 9,393,996 B2 | 7/2016 | Goswami et al. |
| 10,926,818 B1 | 2/2021 | Sasu |
| 2009/0032273 A1* | 2/2009 | Hahn .................. B62D 13/005 172/2 |
| 2019/0009760 A1 | 1/2019 | Zenner et al. |
| 2020/0398823 A1* | 12/2020 | Oba ...................... B62D 53/00 |

* cited by examiner

ASSISTANCE BY TOWED VEHICLE

BACKGROUND

Recreational vehicles, called RVs, are motor vehicles that include living quarters. RVs are often used for vacationing. A common practice is for RV owners to tow a smaller vehicle such as a pickup truck or sport utility vehicle for use at a vacationing destination.

DETAILED DESCRIPTION

Figure 1:
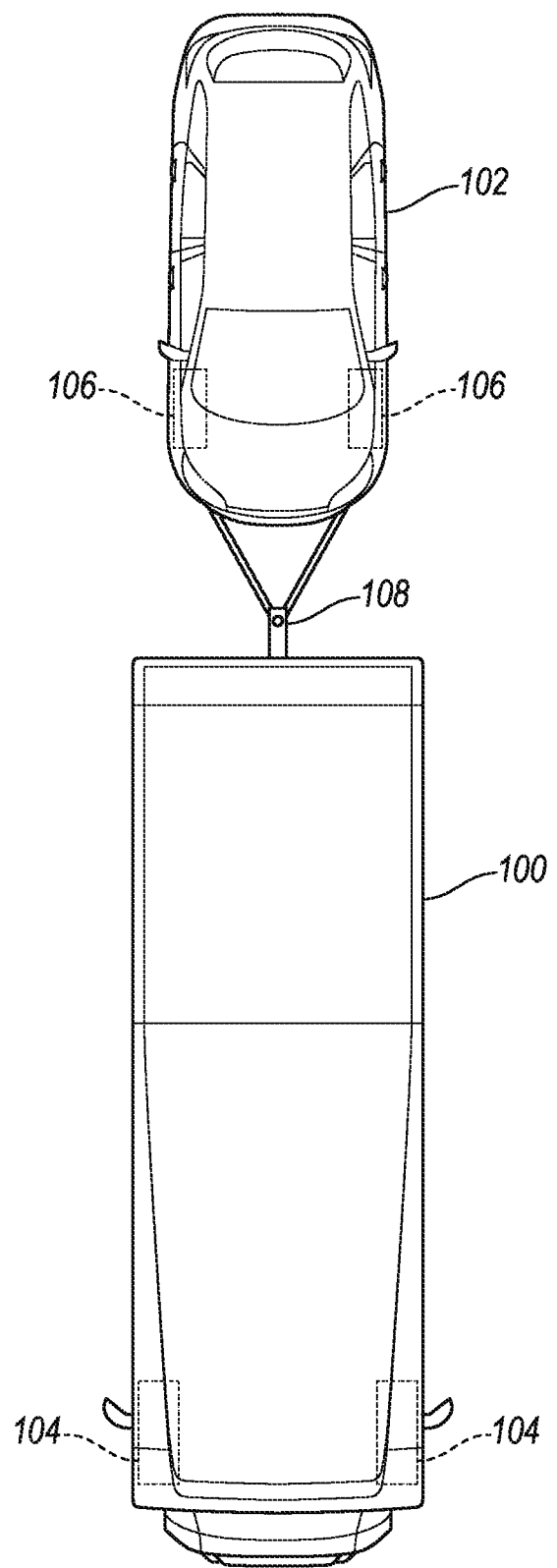
FIG. 1 is a top view of an example first vehicle and an example second vehicle hitched to the first vehicle.

The systems and methods herein provide ways for a towed vehicle to assist a towing vehicle. The towing vehicle, which will be referred to as the first vehicle, can be a large motor vehicle such as an RV (other examples of towing vehicles are possible). As such, the first vehicle may be more difficult to maneuver than smaller vehicles like sedans. The towed vehicle, which will be referred to as the second vehicle, can be a consumer motor vehicle such as sedan, pickup, sport utility vehicle, etc. (again, other examples are possible). As such, the second vehicle is equipped with a propulsion, a brake system, and a steering system. The systems and methods herein describe ways to operate the second vehicle while being towed by the first vehicle in order to assist the first vehicle in maneuvering, e.g., by actuating the propulsion, the brake system, and/or the steering system. For example, when the first vehicle is making a lane change, the second vehicle can actuate its steering system to turn its wheels in the same direction that the wheels of the first vehicle are turning. The lane change is thus completed more swiftly. Advantageously, the second vehicle can provide the types of assistance described herein using hardware that is already typically installed on consumer motor vehicles.

A computer includes a processor and a memory storing instructions executable by the processor to receive data indicating a lane change by a first vehicle that is towing a second vehicle, the data including data indicating a direction that first wheels of the first vehicle are turning while the first vehicle is performing the lane change; and during the lane change, instruct a steering system of the second vehicle to turn second wheels of the second vehicle in a same direction as the first wheels.

The instructions may further include instructions to, during the lane change, refrain from instructing the steering system of the second vehicle to turn the second wheels in response to data indicating that the first vehicle is outside a geofenced area. The geofenced area may be a limited-access road.

The instructions may further include instructions to, during the lane change, refrain from instructing the steering system of the second vehicle to turn the second wheels in response to a speed of the first vehicle being below a threshold speed.

The instructions may further include instructions to, during the lane change, refrain from instructing the steering system of the second vehicle to turn the second wheels in response to failing to receive an input confirming the turning of the second wheels.

Instructing the steering system of the second vehicle to turn the second wheels may include turning the second wheels to a second steering angle based on a first steering angle of the first wheels. The second steering angle may be a gain applied to the first steering angle. The instructions may further include instructions to receive an input setting the gain.

Instructing the steering system of the second vehicle to turn the second wheels may include turning the second wheels to a second steering angle based on a relative angle between the first vehicle and the second vehicle. Instructing the steering system of the second vehicle to turn the second wheels may include applying a feedback loop minimizing a difference between a target angle and the relative angle between the first vehicle and the second vehicle.

The instructions may further include instructions to, in response to a condition, instruct a propulsion of the second vehicle to accelerate the second vehicle. The propulsion may be a second propulsion, and the condition may be at least one of a temperature of a first propulsion of the first vehicle being above a threshold temperature, a fuel level of the first vehicle being below a threshold fuel level, a charge level of the first vehicle being below a threshold charge level, the first vehicle ascending a grade, or the first vehicle passing a third vehicle.

The instructions may further include instructions to, in response to the first vehicle descending a grade, instruct a propulsion of the second vehicle to downshift.

The instructions may further include instructions to, in response to a first brake system of the first vehicle braking, instruct a second brake system of the second vehicle to brake.

The instructions may further include instructions to receive data indicating a parking maneuver by the first vehicle, the data including data indicating the direction that the first wheels are turning while the first vehicle is performing the parking maneuver; and during the parking maneuver, instruct the steering system to turn the second wheels in an opposite direction as the first wheels.

A computer includes a processor and a memory storing instructions executable by the processor to receive data indicating a parking maneuver by a first vehicle that is towing a second vehicle, the data including data indicating a direction that first wheels of the first vehicle are turning while the first vehicle is performing the parking maneuver; during the parking maneuver, lock a third wheel of the second vehicle in response to receiving an input to lock the third wheel; and during the parking maneuver, instruct a steering system of the second vehicle to turn second wheels of the second vehicle in an opposite direction as the first wheels, the second wheels being different than the third wheel.

Instructing the steering system of the second vehicle to turn the second wheels may include turning the second wheels to a second steering angle based on a first steering angle of the first wheels. The second steering angle may be a gain applied to the first steering angle. The instructions may further include instructions to receive an input setting the gain.

A method includes receiving data indicating a lane change by a first vehicle that is towing a second vehicle, the data including data indicating a direction that first wheels of the first vehicle are turning while the first vehicle is performing the lane change; and during the lane change, instruct a steering system of the second vehicle to turn second wheels of the second vehicle in a same direction as the first wheels.

With reference to the Figures, wherein like numerals indicate like parts throughout the several views, a computer 110, 126, 128 includes a processor and a memory storing instructions executable by the processor to receive data indicating a lane change by a first vehicle 100 that is towing a second vehicle 102, the data including data indicating a direction that first wheels 104 of the first vehicle 100 are turning while the first vehicle 100 is performing the lane change; and during the lane change, instruct a second steering system 136 of the second vehicle 102 to turn second wheels 106 of the second vehicle 102 in a same direction as the first wheels 104. The computer 110, 126, 128 can be a first computer 110 in the first vehicle 100, a second computer 128 in the second vehicle 102, a mobile device 126 of an operator of the first vehicle 100, or a combination of the three.

With reference to FIG. 1, the first vehicle 100 may be any passenger or commercial automobile. In particular, the first vehicle 100 can be a larger motor vehicle such as a recreational vehicle (as shown in FIG. 1), a heavy-duty truck, etc.

The second vehicle 102 may be any passenger or commercial automobile such as a car, a truck, a sport utility vehicle, a crossover, a van, a minivan, etc.

When the second vehicle 102 assists the first vehicle 100, the first vehicle 100 is towing the second vehicle 102. For example, the first vehicle 100 and the second vehicle 102 are connected by a tow hitch 108, also referred to as a trailer hitch. The tow hitch 108 can be any suitable type, e.g., a tow ball. The tow hitch 108 permits rotation of the second vehicle 102 relative to the first vehicle 100 around a vertical axis, e.g., passing through the tow ball, as seen by comparing FIG. 1 to FIG. 6 or 7. The tow hitch 108 rigidly connects the first vehicle 100 and the second vehicle 102 to the point through which the vertical axis passes.

Figure 2:
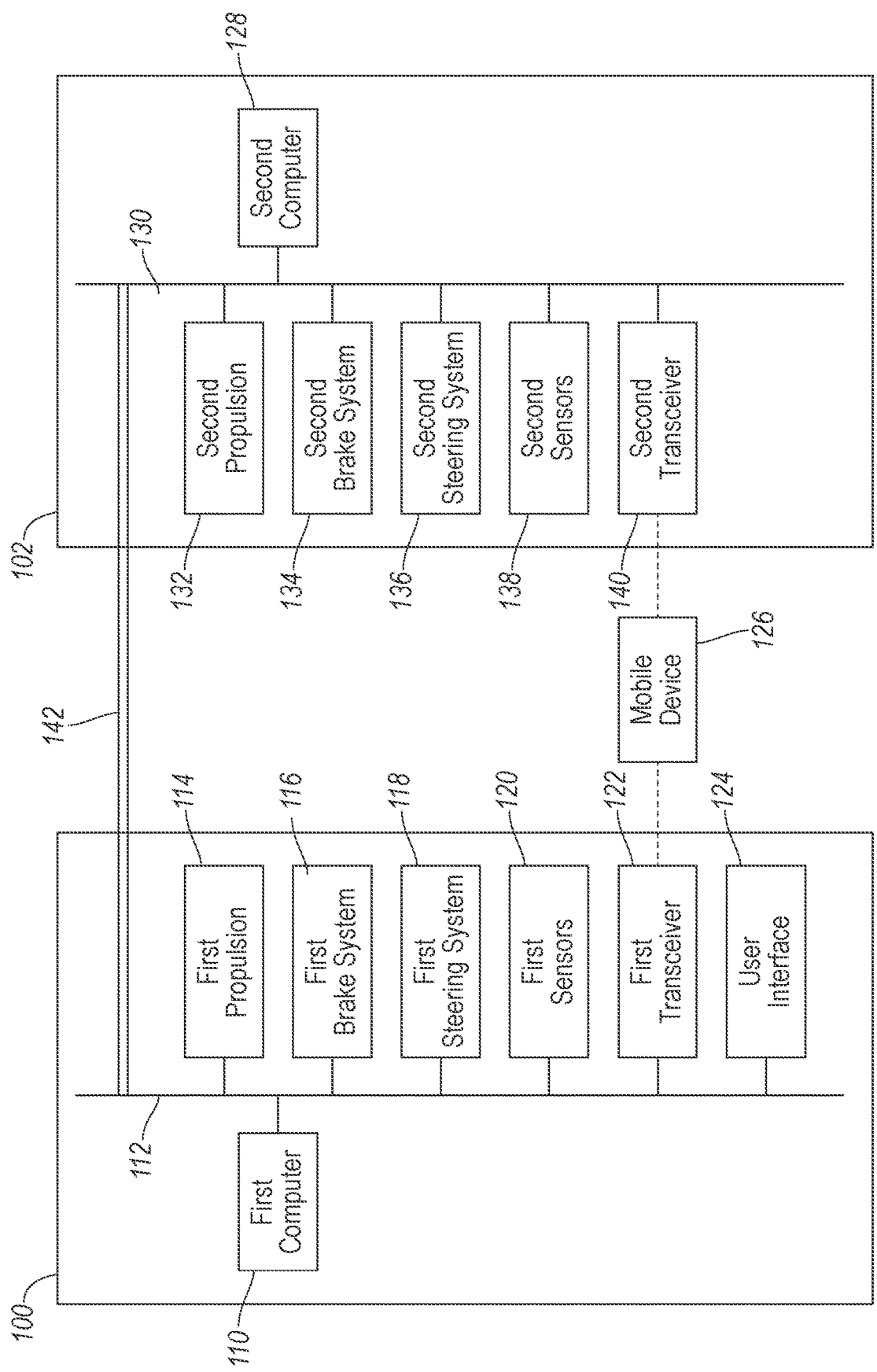
FIG. 2 is a block diagram of the first and second vehicles.

With reference to FIG. 2, the first vehicle 100 includes the first computer 110. The first computer 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The first computer 110 can thus include a processor, a memory, etc. The memory of the first computer 110 can include media for storing instructions executable by the processor as well as for electronically storing data and/or databases, and/or the first computer 110 can include structures such as the foregoing by which programming is provided. The first computer 110 can be multiple computers coupled together within the first vehicle 100.

The first computer 110 may transmit and receive data within the first vehicle 100 through a first communications network 112 such as a controller area network (CAN) bus, Ethernet, WiFi, Local Interconnect Network (LIN), onboard diagnostics connector (OBD-II), and/or by any other wired or wireless communications network. The first computer 110 may be communicatively coupled to a first propulsion 114, a first brake system 116, a first steering system 118, first sensors 120, a first transceiver 122, a user interface 124, and other components via the first communications network 112.

The first propulsion 114 of the first vehicle 100 can generate energy and translates the energy into motion of the first vehicle 100. The first propulsion 114 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The first propulsion 114 can include an electronic control unit (ECU) or the like that is in communication with and receives input from the first computer 110 and/or a human operator. The human operator may control the first propulsion 114 via, e.g., an accelerator pedal and/or a gear-shift lever.

The first brake system 116 is typically a conventional vehicle braking subsystem and resists the motion of the first vehicle 100 to thereby slow and/or stop the first vehicle 100. The first brake system 116 may include friction brakes such as disc brakes, drum brakes, band brakes, etc.; regenerative brakes; any other suitable type of brakes; or a combination. The first brake system 116 can include an electronic control unit (ECU) or the like that is in communication with and receives input from the first computer 110 and/or a human operator. The human operator may control the first brake system 116 via, e.g., a brake pedal.

The first steering system 118 is typically a conventional vehicle steering subsystem and controls the turning of the first wheels 104. The first steering system 118 may be a rack-and-pinion system with electric power-assisted steering, a steer-by-wire system, as both are known, or any other suitable system. The first steering system 118 can include an electronic control unit (ECU) or the like that is in communication with and receives input from the first computer 110 and/or a human operator. The human operator may control the first steering system 118 via, e.g., a steering wheel.

The first sensors 120 may provide data about operation of the first vehicle 100, for example, wheel speed, wheel orientation, and engine and transmission data (e.g., temperature, fuel consumption, etc.). The first sensors 120 may detect the location and/or orientation of the first vehicle 100. For example, the first sensors 120 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The first sensors 120 may detect the external world, e.g., objects and/or characteristics of surroundings of the first vehicle 100, such as other vehicles, road lane markings, traffic lights and/or signs, pedestrians, etc. For example, the first sensors 120 may include radar sensors, scanning laser range finders, light detection and ranging (LIDAR) devices, and image processing sensors such as cameras.

The first transceiver 122 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The first transceiver 122 may be adapted to communicate with a remote server, that is, a server distinct and spaced from the first vehicle 100. For example, the remote server may be associated with another vehicle (e.g., V2V communications), an infrastructure component (e.g., V2I communications), an emergency responder, the mobile device 126 associated with the owner or operator of the first vehicle 100, etc. The remote server may be located outside the first vehicle 100 or, as in the case of the mobile device 126, in a passenger cabin of the first vehicle 100. The first transceiver 122 may be one device or may include a separate transmitter and receiver.

The mobile device 126 is a portable computing device such as a mobile phone, a smartphone, a tablet, etc. The mobile device 126 is a computing device including a processor and a memory. The mobile device 126 can be owned and carried by a person who may be the operator or owner of the first vehicle 100 and/or the second vehicle 102.

The user interface 124 can present information to and/or receive information from the operator of the first vehicle 100. The user interface 124 may be located, e.g., on an instrument panel in a passenger cabin of the first vehicle 100, or wherever may be readily seen by the operator. The user interface 124 may include dials, digital readouts, screens, speakers, and so on for providing information to the operator, e.g., human-machine interface (HMI) elements such as are known. The user interface 124 may include buttons, knobs, keypads, microphone, and so on for receiving information from the operator.

The second vehicle 102 includes the second computer 128. The second computer 128 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The second computer 128 can thus include a processor, a memory, etc. The memory of the second computer 128 can include media for storing instructions executable by the processor as well as for electronically storing data and/or databases, and/or the second computer 128 can include structures such as the foregoing by which programming is provided. The second computer 128 can be multiple computers coupled together within the second vehicle 102.

The second computer 128 may transmit and receive data within the second vehicle 102 through a second communications network 130 such as a controller area network (CAN) bus, Ethernet, WiFi, Local Interconnect Network (LIN), onboard diagnostics connector (OBD-II), and/or by any other wired or wireless communications network. The second computer 128 may be communicatively coupled to a second propulsion 132, a second brake system 134, a second steering system 136, second sensors 138, a second transceiver 140, and other components via the second communications network 130.

The second propulsion 132 of the second vehicle 102 can generate energy and translate the energy into motion of the second vehicle 102. The second propulsion 132 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The second propulsion 132 can include an electronic control unit (ECU) or the like that is in communication with and receives input from the second computer 128 and/or a human operator. The human operator may control the second propulsion 132 via, e.g., an accelerator pedal and/or a gear-shift lever.

The second brake system 134 is typically a conventional vehicle braking subsystem and resists the motion of the second vehicle 102 to thereby slow and/or stop the second vehicle 102. The second brake system 134 may include friction brakes such as disc brakes, drum brakes, band brakes, etc.; regenerative brakes; any other suitable type of brakes; or a combination. The second brake system 134 can apply braking force independently to each of the second wheels 106 (i.e., the turnable front wheels) and third wheels 144 (i.e., nonturnable rear wheels). The second brake system 134 can include an electronic control unit (ECU) or the like that is in communication with and receives input from the second computer 128 and/or a human operator. The human operator may control the second brake system 134 via, e.g., a brake pedal.

The second steering system 136 is typically a conventional vehicle steering subsystem and controls the turning of the second wheels 106. The second steering system 136 may be a rack-and-pinion system with electric power-assisted steering, a steer-by-wire system, as both are known, or any other suitable system. The second steering system 136 can include an electronic control unit (ECU) or the like that is in communication with and receives input from the second computer 128 and/or a human operator. The human operator may control the second steering system 136 via, e.g., a steering wheel.

The second sensors 138 may provide data about operation of the second vehicle 102, for example, wheel speed, wheel orientation, and engine and transmission data (e.g., temperature, fuel consumption, etc.). The second sensors 138 may detect the location and/or orientation of the second vehicle 102. For example, the second sensors 138 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The second sensors 138 may detect the external world, e.g., objects and/or characteristics of surroundings of the second vehicle 102, such as other vehicles, road lane markings, traffic lights and/or signs, pedestrians, etc. For example, the second sensors 138 may include radar sensors, scanning laser range finders, light detection and ranging (LIDAR) devices, and image processing sensors such as cameras.

The second transceiver 140 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The second transceiver 140 may be adapted to communicate with a remote server, that is, a server distinct and spaced from the second vehicle 102. For example, the remote server may be associated with another vehicle (e.g., V2V communications), an infrastructure component (e.g., V2I communications), an emergency responder, the mobile device 126, etc. The remote server may be located outside the second vehicle 102. The second transceiver 140 may be one device or may include a separate transmitter and receiver.

When the first vehicle 100 is towing the second vehicle 102, the first communications network 112 and the second communications network 130 can be communicatively coupled by a communications link 142. The communications link 142 can be a wired or wireless link. For example, the communications link 142 can be a cord plugged into the CAN networks of the first communications network 112 and the second communications network 130 and running along the tow hitch 108 between the first vehicle 100 and the second vehicle 102. For another example, the first communications network 112 and the second communications network 130 can be linked via communications between the first transceiver 122 and the second transceiver 140.

With reference to FIGS. 3-7, the computer 110, 126, 128 can be programmed to instruct systems of the second vehicle 102 to assist in the operation of the first vehicle 100. For example, the computer 110, 126, 128 can be programmed to instruct the second propulsion 132 to accelerate the second vehicle 102 and thereby assist in accelerating the first vehicle 100, to instruct the second propulsion 132 to downshift to assist in slowing the first vehicle 100, to instruct the second brake system 134 to brake to assist in slowing the first vehicle 100, to instruct the second steering system 136 to turn the second wheels 106 in the same direction as the first wheels 104 to assist the first vehicle 100 in performing a lane change, and/or to instruct the steering system to turn the second wheels 106 in the opposite direction as the first wheels 104 to assist the first vehicle 100 in performing a parking maneuver, as will each be described in turn. These assist features can occur independently or in tandem, e.g., if the first vehicle 100 is changing lanes in order to pass a third vehicle, the computer 110, 126, 128 can both instruct the second steering system 136 to turn the second wheels 106 in the same direction as the first wheels 104 and instruct the second propulsion 132 to accelerate. When the first vehicle 100 is towing the second vehicle 102, the second propulsion 132 is in neutral by default, unless the assist feature involves instructing the second propulsion 132 to assist the first vehicle 100.

Figure 3:
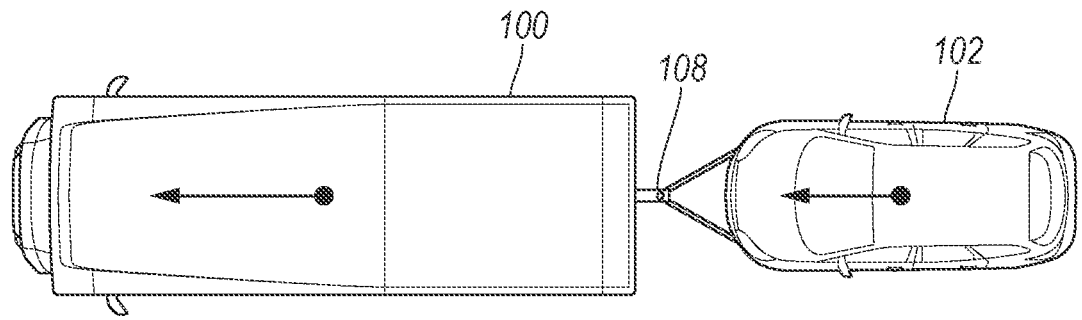
FIG. 3 is a top view of the first vehicle and the second vehicle with the second vehicle accelerating.

With reference to FIG. 3, the computer 110, 126, 128 can be programmed to, in response to a condition, instruct the second propulsion 132 to accelerate the second vehicle 102. The acceleration provided by the second propulsion 132 can supplement the acceleration provided by the first propulsion 114 in situations in which additional acceleration is beneficial, or the acceleration provided by the second propulsion 132 can permit reduced acceleration by the first propulsion 114, thereby conserving the energy and/or lifespan of the first propulsion 114.

A condition under which the computer 110, 126, 128 instructs the second propulsion 132 to accelerate can be at least one of a plurality of conditions. A first possible condition is that a temperature of the first propulsion 114 is above a threshold temperature. The temperature of the first propulsion 114 can be reported by the first sensors 120 to the computer 110, 126, 128. The threshold temperature can be chosen to indicate a possibility of damage or degradation of the first propulsion 114. Using the second propulsion 132 can thus avoid such damage or degradation to the first propulsion 114.

A second possible condition is that a fuel level of the first vehicle 100 is below a threshold fuel level (if the first propulsion 114 includes an internal-combustion engine, e.g., a conventional or hybrid system) or a charge level of the first vehicle 100 is below a threshold charge level (if the first propulsion 114 includes high-voltage batteries, e.g., a hybrid or a battery-electric system). The threshold levels can be chosen to leave sufficient energy for the first vehicle 100 and the second vehicle 102 to travel to a gas station or charging station. Using the second propulsion 132 can thus extend the range of the first vehicle 100.

A third possible condition is that the first vehicle 100 is ascending a grade. The computer 110, 126, 128 can determine that the first vehicle 100 is ascending a grade based on, e.g., data received from an IMU of the first sensors 120 or the second sensors 138 or map data stored in the memory of the computer 110, 126, 128. Using the second propulsion 132 can thus provide additional acceleration to maintain a speed while traveling up the grade.

A fourth possible condition is that the first vehicle 100 is passing a third vehicle. The computer 110, 126, 128 can determine that the first vehicle 100 is passing the third vehicle based on, e.g., data from the first sensors 120 indicating that the third vehicle is in a lane to the right of the lane of travel of the first vehicle 100 and is traveling slower than the first vehicle 100, data from the first sensors 120 indicating that a position of the first vehicle 100 is in a lane designated for passing, etc.

A fifth possible condition is that the operator provided an input requesting that the second propulsion 132 accelerate, e.g., to the user interface 124 or the mobile device 126.

The operator can provide inputs that affect the assistance provided by the second propulsion 132. For example, in response to at least one of the foregoing conditions, the computer 110, 126, 128 can output a message to the operator requesting permission for the second propulsion 132 to accelerate, e.g., via the user interface 124 or the mobile device 126. The computer 110, 126, 128 can then wait until the operator provides an input granting permission before instructing the second propulsion 132 to accelerate.

For another example, the operator can input values for settings controlling the acceleration of the second propulsion 132, e.g., a gain or gains. A gain is a multiplier of a parameter resulting in a value used for controlling a system, in this case controlling the acceleration, e.g., the acceleration of the second propulsion 132 is a product of the gain and a parameter, i.e., $a_2 = G_i P_i$, in which $a_2$ is the level of acceleration by the second propulsion 132, $G_i$ is the gain, $P_i$ is the parameter, and i is an index of the condition prompting the second propulsion 132 to accelerate, e.g., i=1 for the first condition above, i=2 for the second condition above, etc. The parameter can depend on the condition, such as the temperature of the first propulsion 114 for the first condition, the fuel level or charge level of the first vehicle 100 for the second condition, a steepness of the grade for the third condition, and an acceleration requested of the first propulsion 114, e.g., by the operator pressing an accelerator pedal in the first vehicle 100, for the fourth and fifth conditions. The settings can include a different gain for each of the conditions described above. Alternatively, the parameter for all the conditions can be the acceleration level requested of the first propulsion 114, and the gain can also be the same for all the conditions.

The computer 110, 126, 128 can control the level of acceleration provided by the second propulsion 132 according to the appropriate gain. The gain(s) can be settings inputted by the operator, as just described. The settable value(s) for the gain(s) can be capped at a maximum value(s) chosen to ensure stability between the first vehicle 100 and the second vehicle 102. The gain(s) can be a default value(s) prestored in the memory in the absence of inputs from the operator. Alternatively, the gain(s) can be a preset value(s) stored in the memory.

The computer 110, 126, 128 can instruct the second propulsion 132 to cease accelerating upon none of the conditions above being true, or upon the condition that triggered the acceleration no longer being true. Alternatively or additionally, the computer 110, 126, 128 can instruct the second propulsion 132 to cease accelerating upon receiving an input from the operator to cease the acceleration. Alternatively or additionally, the computer 110, 126, 128 can instruct the second propulsion 132 to cease accelerating upon the first brake system 116 braking.

Figure 4:
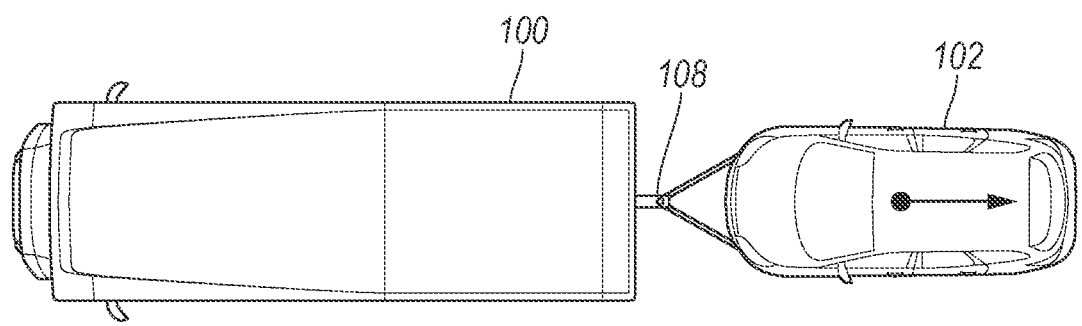
FIG. 4 is a top view of the first vehicle and the second vehicle with the second vehicle downshifting.

With reference to FIG. 4, the computer 110, 126, 128 can be programmed to, in response to a condition, instruct the second propulsion 132 to downshift. Downshifting can serve as engine braking to slow the first vehicle 100 and the second vehicle 102, e.g., in situations in which the first vehicle 100 and second vehicle 102 would tend to accelerate such as descending a grade. Downshifting can be limited to when the second propulsion 132 is providing acceleration assistance, as described above with respect to FIG. 3.

The condition under which the computer 110, 126, 128 instructs the second propulsion 132 to downshift can be at least one of a plurality of conditions. A first condition is that the first vehicle 100 is descending a grade. The computer 110, 126, 128 can determine that the first vehicle 100 is descending a grade based on, e.g., data received from an IMU of the first sensors 120 or the second sensors 138, map data stored in the memory of the computer 110, 126, 128, or determining that the first vehicle 100 is accelerating while there is no input instructing the first propulsion 114 to accelerate. Using the second propulsion 132 can thus provide deceleration to prevent a speed of the first vehicle 100 from increasing while traveling down the grade. A second condition is that the operator provided an input requesting that the second propulsion 132 downshift.

The operator can provide inputs that affect the assistance provided by the second propulsion 132. For example, in response to the first condition, the computer 110, 126, 128 can output a message to the operator requesting permission for the second propulsion 132 to downshift, e.g., via the user interface 124 or the mobile device 126. The computer 110, 126, 128 can then wait until the operator provides an input granting permission before instructing the second propulsion 132 to downshift.

The computer 110, 126, 128 can instruct the second propulsion 132 to downshift multiple times at predefined intervals as long as the first condition remains true. The predefined intervals can be chosen based on the gear ratios of gears of a transmission of the second propulsion 132. The computer 110, 126, 128 can instruct the second propulsion 132 to refrain from downshifting upon the first condition no longer being true. The computer 110, 126, 128 can instruct the second propulsion 132 to downshift multiple times at the predefined intervals after receiving the input to downshift and can instruct the second propulsion 132 to refrain from downshifting upon receiving an input from the operator to cease downshifting.

Figure 5:
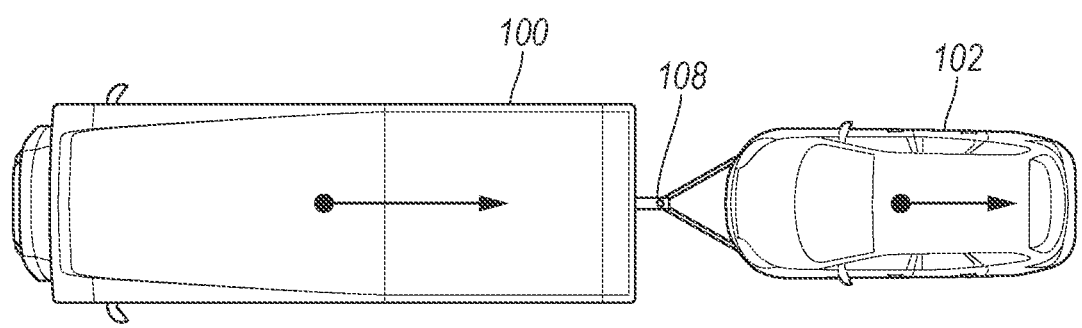
FIG. 5 is a top view of the first vehicle and the second vehicle with the second vehicle braking.

With reference to FIG. 5, the computer 110, 126, 128 is programmed to, in response to a condition, instruct the second brake system 134 to brake. The braking force provided by the second brake system 134 can supplement the braking force provided by the first brake system 116, thereby more quickly reducing the speed of the first vehicle 100 and second vehicle 102.

The condition under which the computer 110, 126, 128 instructs the second brake system 134 to brake can be at least one of a plurality of conditions, e.g., that the first brake system 116 is braking, which can be divided into multiple conditions. A first condition can be that the first brake system 116 is braking at any level of brake force. In other words, the first brake system 116 and the second brake system 134 brake together. A second condition can be that the first brake system 116 is braking at a brake force above a threshold. The threshold can be chosen to indicate braking to stop quickly as opposed to braking to slow without stopping or to stop at a planned point on the roadway. In other words, the second brake system 134 assists the first brake system 116 when the operator is attempting to stop the first vehicle 100 and second vehicle 102 more quickly.

A third condition can be a temperature of the first brake system 116 is above a threshold temperature. The temperature of the first brake system 116 can be reported by the first sensors 120 to the computer 110, 126, 128. The threshold temperature can be chosen to indicate a possibility of damage or degradation of the first brake system 116 or to indicate braking to stop quickly as opposed to braking to slow without stopping or to stop at a planned point on the roadway.

The operator can provide inputs that affect the assistance provided by the second brake system 134. For example, in response to at least one of the foregoing conditions, the computer 110, 126, 128 can output a message to the operator requesting permission for the second brake system 134 to brake, e.g., via the user interface 124 or the mobile device 126. The computer 110, 126, 128 can then wait until the operator provides an input granting permission before instructing the second brake system 134 to brake.

For another example, the operator can input values for settings controlling the braking force of the second propulsion 132, e.g., a gain. In this case, the gain is a multiplier of the braking force of the first brake system 116, and the product of the gain and the braking force of the first brake system 116 is the braking force that the computer 110, 126, 128 instructs the second brake system 134 to apply, i.e., $B_2 = GB_1$, in which $B_2$ is the braking force of the second brake system 134, G is the gain, and $B_1$ is the braking force of the first brake system 116.

The computer 110, 126, 128 can control the braking force provided by the second brake system 134 according to the gain. The gain can be a setting inputted by the operator, as just described. The settable value for the gain can be capped at a maximum value chosen to ensure stability between the first vehicle 100 and the second vehicle 102. The gain can be a default value prestored in the memory in the absence of an input from the operator. Alternatively, the gain can be a preset value stored in the memory.

The computer 110, 126, 128 can instruct the second brake system 134 to cease braking upon the first brake system 116 ceasing to brake, for the first condition or for both the first and second conditions. Alternatively, for the second condition, the computer 110, 126, 128 can instruct the second brake system 134 to cease braking upon the braking force of the first brake system 116 dropping below the threshold braking force.

Figure 6:
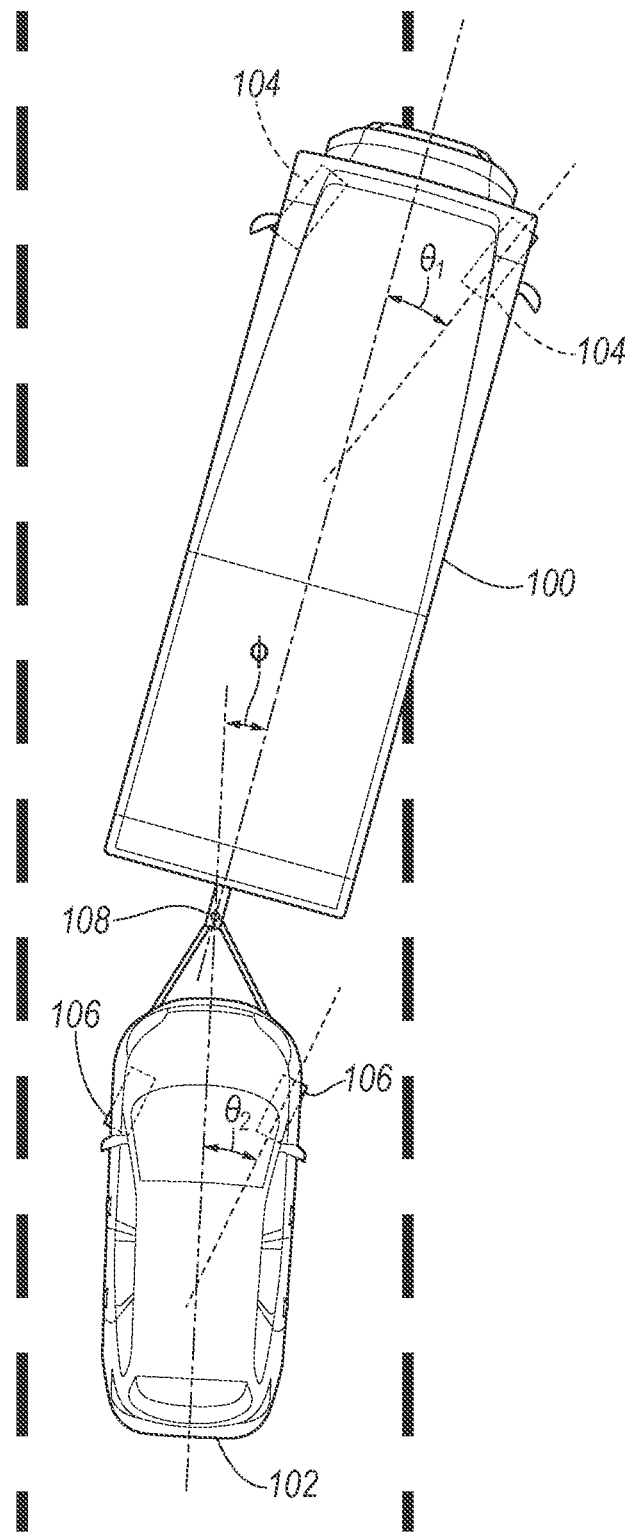
FIG. 6 is a top view of the first vehicle and the second vehicle performing a lane change.

With reference to FIG. 6, the computer 110, 126, 128 can be programmed to, in response to data indicating a lane change by the first vehicle 100, instruct the second steering system 136 to turn the second wheels 106 in the same direction as the first wheels 104, i.e., as the first steering system 118 is turning the first wheels 104. The movement of the second vehicle 102 can help the first vehicle 100 and second vehicle 102 complete the lane change more quickly by reducing the extent to which the second vehicle 102 lags behind the first vehicle 100 in traveling laterally from the old lane of travel to the new lane of travel.

The data indicating the lane change can include data from the first sensors 120 and/or second sensors 138, map data, and/or control data of the first vehicle 100. For example, the data can include location data, e.g., from a GPS sensor of the first sensors 120, and map data that together indicate that the first vehicle 100 is on a multilane road and/or is not at an intersection, as well as indicating a lateral position of the first vehicle 100 within the current lane of travel. The data can include image data from a camera of the first sensors 120 indicating the locations of lane boundaries relative to the first vehicle 100. The data can include data indicating a direction that the first wheels 104 are turning, e.g., a first steering angle $\theta_1$ of the first wheels 104. The direction that the first wheels 104 are turning can be indicated by the sign of the first steering angle $\theta_1$, e.g., positive for turning left and negative for turning right. The computer 110, 126, 128 can determine that the first vehicle 100 is performing a lane change based on, e.g., the lateral position of the first vehicle 100 being with a threshold distance of a lane boundary while the first steering angle $\theta_1$ is above a threshold angle. The threshold distance and threshold angle can be chosen to be outside of typical variation when traveling in a lane without making a lane change.

When the computer 110, 126, 128 has determined that the first vehicle 100 is performing the lane change, instructing the second steering system 136 to turn the second wheels 106 can be conditional on one or more conditions being met. In other words, the computer 110, 126, 128 is programmed to, in response to the data indicating that the first vehicle 100 is performing the lane change and at least one of the following conditions being true, instruct the second steering system 136 to turn the second wheels 106 in the same direction as the first wheels 104. The computer 110, 126, 128 is programmed to, in response to data indicating that the first vehicle 100 is performing the lane change and none of the following conditions being true, refrain from instructing the second steering system 136 to turn the second wheels 106 in the same direction as the first wheels 104.

A first condition can be data indicating that the first vehicle 100 is inside a geofenced area. A geofenced area is a geographical area enclosed by preset virtual boundaries. For example, the geofenced area can be one or more limited-access roads. A limited-access road is a road with onramps and offramps rather than intersections, such as an interstate highway. In other words, the computer 110, 126, 128 is programmed to, during a lane change, refrain from instructing the second steering system 136 to turn the second wheels 106 in response to the data indicating that the first vehicle 100 is outside the geofenced area.

A second condition can be that a speed of the first vehicle 100 is above a threshold speed. The threshold speed can be chosen to indicate that the first vehicle 100 is engaged in highway driving, e.g., 60 miles per hour. In other words, the computer 110, 126, 128 is programmed to, during a lane change, refrain from instructing the second steering system 136 to turn the second wheels 106 in response to the speed of the first vehicle 100 being below the threshold speed.

A third condition is that the operator provided an input confirming the turning of the second wheels 106. The computer 110, 126, 128 can be programmed to, in response to the data indicating the lane change, output a message to the operator requesting permission for the second steering system 136 to turn the second wheels 106, e.g., via the user interface 124 or the mobile device 126. The computer 110, 126, 128 can then wait until the operator provides an input confirming permission before instructing the second steering system 136 to turn the second wheels 106. The computer 110, 126, 128 is programmed to, during a lane change, refrain from instructing the second steering system 136 to turn the wheels in response to failing to receive the input confirming the turning of the second wheels 106.

The operator can provide inputs that affect the assistance provided by the second steering system 136. For example, the operator can input values for settings controlling the turning of the second wheels 106, e.g., a gain. In this case, the gain is a multiplier of the first steering angle $\theta_1$, and the product of the gain G and the first steering angle $\theta_1$ is a second steering angle $\theta_2$ of the second wheels 106, i.e., $\theta_2 = G\theta_1$. The computer 110, 126, 128 instructs the second steering system 136 to turn the second wheels 106 to the second steering angle $\theta_2$.

During the lane change, the computer 110, 126, 128 can control the second steering angle $\theta_2$ according to the gain G, e.g., based on the gain G and the first steering angle $\theta_1$ by applying the gain G to the first steering angle $\theta_1$. The gain can be a setting inputted by the operator, as just described. The settable value for the gain can be capped at a maximum value chosen to ensure stability between the first vehicle 100 and the second vehicle 102, e.g., less than 1, i.e., the second steering angle $\theta_2$ is less than the first steering angle $\theta_1$. The gain can be a default value prestored in the memory in the absence of an input from the operator. Alternatively, the gain can be a preset value stored in the memory.

Alternatively, the computer 110, 126, 128 can control the second steering angle $\theta_2$ based on a relative angle $\varphi$ between the first vehicle 100 and the second vehicle 102, e.g., by applying the gain G to the relative angle $\varphi$, i.e., $\theta_2 = G\varphi$. The relative angle $\varphi$ is an angle in a horizontal plane between a longitudinal direction of the first vehicle 100, i.e., a direction of straight-ahead travel by the first vehicle 100, and a longitudinal direction of the second vehicle 102.

For another example, the computer 110, 126, 128 can control the second steering angle $\theta_2$ based on the relative angle $\varphi$ between the first vehicle 100 and the second vehicle 102, e.g., by applying a feedback loop minimizing a difference between a target angle $\varphi_0$ and the relative angle $\varphi$. The target angle $\varphi_0$ is chosen to push the second vehicle 102 into a following position, e.g., 0°, i.e., the second vehicle 102 is straight behind the first vehicle 100. The feedback loop can be implemented in any suitable manner, e.g., as a proportional-integral-derivative (PID) controller programmed in the computer 110, 126, 128.

For another example, the computer 110, 126, 128 can control the second steering angle $\theta_2$ based on a combination of the foregoing techniques, e.g., a weighted average of two or three of the techniques, e.g., $\theta_2 = w_\theta G\theta_1 + w_\varphi G\varphi + w_{PID} PID(\varphi)$, in which $w_\theta$, $w_\varphi$, and $w_{PID}$ are weights that sum to 1; and PID( ) is a function representing the output of the feedback loop. The weights $w_\theta$, $w_\varphi$, and $w_{PID}$ can be chosen based on testing with operators rating the responsiveness or smoothness of the handling while performing lane changes.

The computer 110, 126, 128 can instruct the second steering system 136 to turn the second wheels 106 during the lane change and cease turning the wheels, e.g., set the second steering angle $\theta_2$ to zero, upon determining that the lane change has concluded. The computer 110, 126, 128 can determine that the lane change has concluded based on the lateral position of the first vehicle 100 in the new lane of travel being beyond a threshold lateral position. Alternatively or additionally, the computer 110, 126, 128 can determine that the lane change has concluded based on the direction of the first wheels 104 changing, i.e., the first steering angle $\theta_1$ decreasing to or below 0°, meaning that the first vehicle 100 has fully moved into the new lane and is now aligning the trajectory of the first vehicle 100 with the direction of the new lane.

Figure 7:
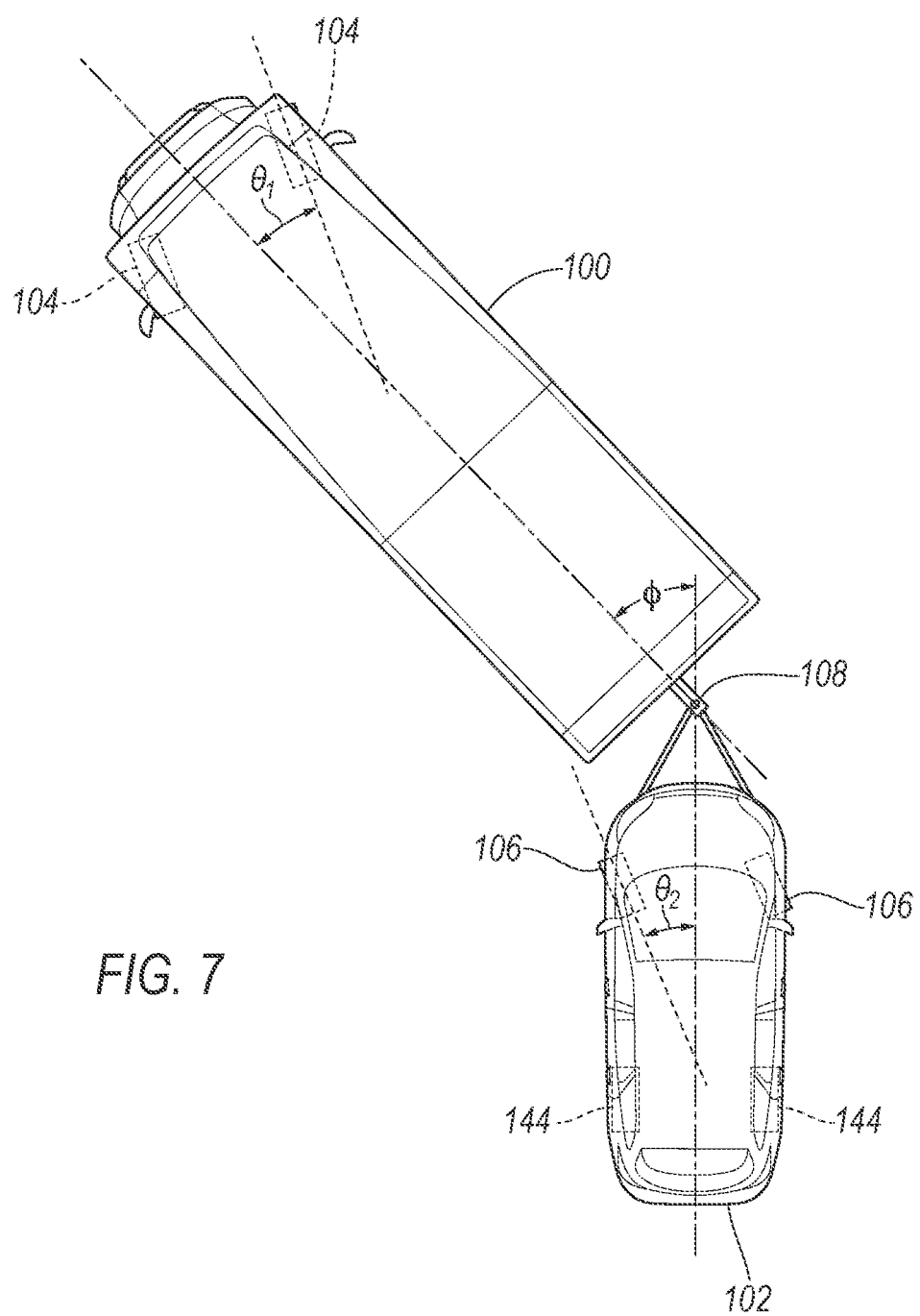
FIG. 7 is a top view of the first vehicle and the second vehicle performing a parking maneuver.

With reference to FIG. 7, the computer 110, 126, 128 can be programmed to, in response to data indicating a parking maneuver by the first vehicle 100, instruct the second steering system 136 to turn the second wheels 106 in an opposite direction as the first wheels 104, i.e., as the first steering system 118 is turning the first wheels 104. This can reduce the turning radius of the combination of the first vehicle 100 and the second vehicle 102, which can help the first vehicle 100 and second vehicle 102 maneuver into parking locations. Additionally, the computer 110, 126, 128 can be programmed to, in response to inputs by the operator during the parking maneuver, instruct the second propulsion 132 to accelerate the second vehicle 102 or instruct the second brake system 134 to lock one of the third wheels 144 of the second vehicle 102. Accelerating the second vehicle 102 can further tighten the turning radius of the first vehicle 100 and second vehicle 102. Locking the third wheel 144 (e.g., one of the rear wheels) of the second vehicle 102 can increase maneuverability by permitting pivoting around the third wheel 144.

The data indicating the parking maneuver can include data from the first sensors 120 and/or second sensors 138, map data, and control data of the first vehicle 100. For example, the data can include location data, e.g., from a GPS sensor of the first sensors 120, and map data that together indicate that the first vehicle 100 is in a parking lot or other area designated in the map data for parking. The data can be that the first propulsion 114 is in reverse. The data includes data indicating a direction that the first wheels 104 are turning, e.g., the first steering angle $\theta_1$ of the first wheels 104. The direction that the first wheels 104 are turning can be indicated by the sign of the first steering angle $\theta_1$, e.g., positive for turning left and negative for turning right. Additionally or alternatively, the data can be an input by the operator indicating that the first vehicle 100 will perform the parking maneuver, such as a selection of a parking mode within the user interface 124 or the mobile device 126.

When the computer 110, 126, 128 has determined that the first vehicle 100 is performing the parking maneuver (other than by an input from the operator), instructing the second steering system 136 to turn the second wheels 106 can be conditional on a confirmation input, i.e., that the operator provided an input confirming the turning of the second wheels 106. The computer 110, 126, 128 can be programmed to, in response to the data indicating the parking maneuver, output a message to the operator requesting permission for the second steering system 136 to turn the second wheels 106, e.g., via the user interface 124 or the mobile device 126. The computer 110, 126, 128 can then wait until the operator provides an input confirming permission before instructing the second steering system 136 to turn the second wheels 106. The computer 110, 126, 128 is programmed to, during a parking maneuver, refrain from instructing the second steering system 136 to turn the wheels in response to failing to receive the input confirming the turning of the second wheels 106.

The operator can provide inputs that affect the assistance provided by the second steering system 136. For example, the operator can input values for settings controlling the turning of the second wheels 106, e.g., a gain. In this case, the gain is a multiplier of the first steering angle $\theta_1$, and the product of the gain G and the first steering angle $\theta_1$ is a second steering angle $\theta_2$ of the second wheels 106, i.e., $\theta_2 = -G\theta_1$. The negative sign indicates that the second steering system 136 turns the second wheels 106 the opposite direction as the first steering system 118 is turning the first wheels 104. The computer 110, 126, 128 instructs the second steering system 136 to turn the second wheels 106 to the second steering angle $\theta_2$.

The computer 110, 126, 128 can be programmed to, in response to the data indicating the parking maneuver, output a menu to the operator, e.g., via the user interface 124 or the mobile device 126. The menu can include locking one of the third wheels 144 of the second vehicle 102, i.e., one option for the left rear wheel and one option for the right rear wheel, to create a pivot point for the second vehicle 102. The computer 110, 126, 128 can be programmed to, in response to receiving an input selecting the third wheel 144 and confirming to lock the selected third wheel 144, lock the selected third wheel 144 of the second vehicle 102. The computer 110, 126, 128 can lock the third wheel 144 by instructing the second brake system 134 to apply the brakes for only the third wheel 144. The computer 110, 126, 128 can be programmed to output an option to release the locked third wheel 144. The computer 110, 126, 128 can be programmed to, in response to receiving an input to release the third wheel 144, release the locked third wheel 144.

The menu can also include instructing the second propulsion 132 to accelerate the second vehicle 102. The computer 110, 126, 128 can be programmed to, in response to receiving an input instructing the second propulsion 132 to accelerate, instruct the second propulsion 132 to accelerate. The computer 110, 126, 128 can be programmed to instruct the second propulsion 132 to accelerate the second vehicle 102 to a preset speed chosen to be suitable for parking maneuvers, e.g., 1 or 2 miles per hour. The computer 110, 126, 128 can be programmed to output an option to cease accelerating the second vehicle 102. The computer 110, 126, 128 can be programmed to, in response to receiving an input to cease accelerating the second vehicle 102 (i.e., selecting the option outputted by the computer 110, 126, 128), instruct the second propulsion 132 to cease accelerating. Accelerating the second vehicle 102 during the parking maneuver can tighten the turning radius of the first vehicle 100 and second vehicle 102.

During the parking maneuver, the computer 110, 126, 128 can control the second steering angle $\theta_2$ according to the gain G, e.g., based on the gain G and the first steering angle $\theta_1$ by applying the gain G to the first steering angle $\theta_1$. The gain can be a setting inputted by the operator, as described above. The settable value for the gain can be capped at a maximum value chosen to ensure stability between the first vehicle 100 and the second vehicle 102. The gain can be a default value prestored in the memory in the absence of an input from the operator. Alternatively, the gain can be a preset value stored in the memory.

Alternatively, the computer 110, 126, 128 can control the second steering angle $\theta_2$ based on the relative angle $\varphi$ between the first vehicle 100 and the second vehicle 102, e.g., by applying the gain G to the relative angle $\varphi$, i.e., $\theta_2 = -G\varphi$. The relative angle $\varphi$ is an angle in a horizontal plane between a longitudinal direction of the first vehicle 100, i.e., a direction of straight-ahead travel by the first vehicle 100, and a longitudinal direction of the second vehicle 102.

For another example, the computer 110, 126, 128 can control the second steering angle $\theta_2$ based on the relative angle $\varphi$ between the first vehicle 100 and the second vehicle 102, e.g., by applying a feedback loop minimizing a difference between a target angle $\varphi_0$ and the relative angle $\varphi$. For example, the target angle $\varphi_0$ can be a function of a speed v of the first vehicle 100 and the first steering angle, i.e., $\varphi_0 = f(v, \theta_1)$. The target angle $\varphi_0$ can have a decreasing relationship with the speed v and an increasing relationship with the first steering angle $\theta_1$. For another example, the target angle $\varphi_0$ can be chosen during the parking maneuver based on a selected location in which to park the first vehicle 100 and second vehicle 102. The computer 110, 126, 128 can be programmed to, in response to receiving an input selecting a location, e.g., on a map displayed on the user interface 124 or the mobile device 126, calculate the target angle $\varphi_0$ that would provide a turning radius permitting the first vehicle 100 and second vehicle 102 to travel into the selected location. The feedback loop can be implemented in any suitable manner, e.g., as a proportional-integral-derivative (PID) controller programmed in the computer 110, 126, 128.

For another example, the computer 110, 126, 128 can control the second steering angle $\theta_2$ based on a combination of the foregoing techniques, e.g., a weighted average of two or three of the techniques, e.g., $\theta_2 = -(w_\theta G\theta_1 + w_\varphi G\varphi + w_{PID} PID(\varphi))$, in which $w_\theta$, $w_\varphi$, and $w_{PID}$ are weights that sum to 1; and PID( ) is a function representing the output of the feedback loop. The weights $w_\theta$, $w_\varphi$, and $w_{PID}$ can be chosen based on testing with operators rating the responsiveness or smoothness of the handling while performing lane changes.

The computer 110, 126, 128 can continue controlling the second steering angle $\theta_2$ while locking the third wheel 144 or accelerating the second vehicle 102 if those options are selected by the operator. The computer 110, 126, 128 can instruct the second steering system 136 to cease turning the wheels, e.g., set the second steering angle $\theta_2$ to zero, upon determining that the parking maneuver has concluded. The computer 110, 126, 128 can determine that the parking maneuver has concluded based on a current location of the first vehicle 100 being a selected location to park the first vehicle 100. The computer 110, 126, 128 can determine that the parking maneuver has concluded based on a speed of the first vehicle 100 exceeding a threshold speed. The threshold speed can be chosen to be greater than typical speeds for parking. The computer 110, 126, 128 can determine that the parking maneuver has concluded based on a transmission of the first propulsion 114 being shifted into park and a brake pedal of the first vehicle 100 having no input, i.e., being undepressed. The computer 110, 126, 128 can determine that the parking maneuver has concluded based on an input by the operator indicating that the parking maneuver has concluded, e.g., exiting the parking mode.

Figure 8:
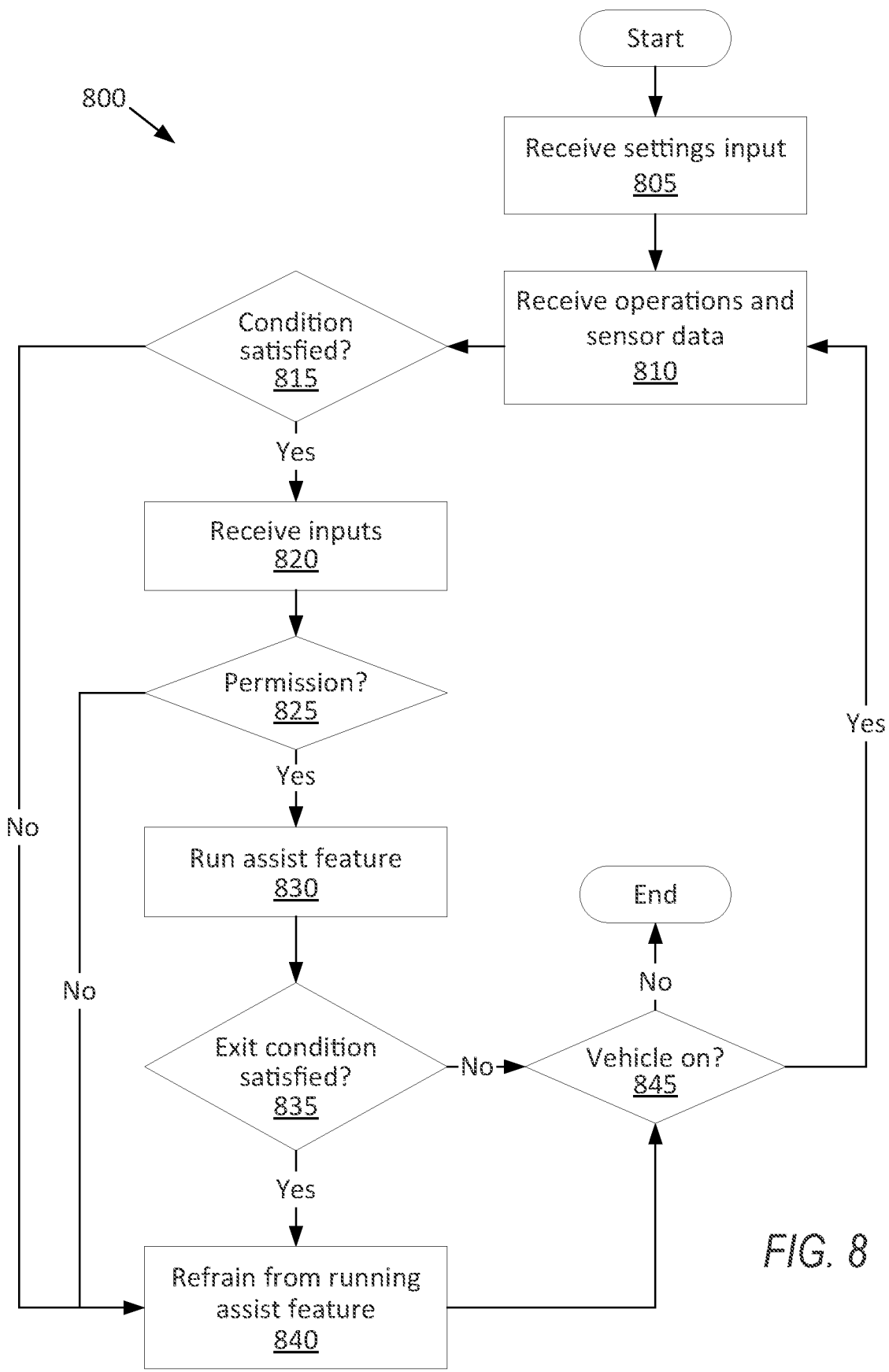
FIG. 8 is a process flow diagram of an example process for the second vehicle to assist the first vehicle.

FIG. 8 is a process flow diagram illustrating an exemplary process 800 for the second vehicle 102 to assist the first vehicle 100. The memory of the computer 110, 126, 128 stores executable instructions for performing the steps of the process 800 and/or programming can be implemented in structures such as mentioned above. As a general overview of the process 800, the computer 110, 126, 128 receives settings inputted from the operator and receives data from the first sensors 120 and second sensors 138 and control data for systems of the first vehicle 100 and second vehicle 102. If one of the conditions for one of the assist features is satisfied and the operator provides an input confirming to execute the assist feature, the computer 110, 126, 128 executes the assist feature until one of the conditions for ending that assist feature is satisfied. If none of the conditions for the assist features are satisfied or if the operator does not confirm to execute the assist feature, the computer 110, 126, 128 refrains from executing the assist feature. The process 800 can continue for as long as the vehicle is on.

The process 800 begins in a block 805, in which the computer 110, 126, 128 receives input from the operator with values for settings of the assist features, e.g., values for the different gains corresponding to the different assist features.

Next, in a block 810, the computer 110, 126, 128 receives data from the first sensor and the second sensor and receives control data for controlling systems of the first vehicle 100 such as the first propulsion 114, first brake system 116, and first steering system 118.

Next, in a decision block 815, the computer 110, 126, 128 determines whether any of the conditions for any of the assist features are satisfied, as described above with respect to each assist feature. For example, for the assist feature of actuating the second propulsion 132, the computer 110, 126, 128 determines whether the temperature of the first propulsion 114 is above the threshold temperature, or whether the fuel level of the first vehicle 100 is below the threshold fuel level, etc. For another example, for the lane-change assist feature, the computer 110, 126, 128 determines whether it has received data indicating a lane change and whether the first vehicle 100 is inside the geofenced area or the speed of the first vehicle 100 is above the threshold speed. If one of the conditions is satisfied, the process 800 proceeds to a block 820. If none of the conditions are satisfied, the process 800 proceeds to a block 840.

In the block 820, the computer 110, 126, 128 receives inputs for the assist feature for which the condition was satisfied in the decision block 815, which will be referred to as the activated assist feature. The computer 110, 126, 128 can output a message to the operator requesting permission to perform the activated assist feature, and the input can be confirming or denying the permission. The input can also include a value for the gain corresponding to the activated assist feature.

Next, in a decision block 825, the computer 110, 126, 128 determines whether the operator has provided permission to execute the activated assist feature. If the operator provided an input confirming permission to execute the activated assist feature in the block 820, the process 800 proceeds to a block 830. If the operator provided an input denying permission to execute the activated assist feature or failed to provide an input within a preset time limit, the process 800 proceeds to the block 840.

In the block 830, the computer 110, 126, 128 executes the activated assist feature, as described with respect to each of the assist features above.

Next, in a decision block 835, the computer 110, 126, 128 determines whether any of the conditions for ceasing the activated assist feature described above are satisfied. For example, if actuating the second propulsion 132 is the activated assist feature, the computer 110, 126, 128 determines whether the condition satisfied in the decision block 815 is no longer true, whether the computer 110, 126, 128 has received an input from the operator to cease the acceleration, or whether the first brake system 116 braked. For another example, if the lane-change assist feature is the activated assist feature, the computer 110, 126, 128 determines whether the lane change has concluded, as described above. If one of the conditions for ceasing the activated assist feature is satisfied, the process 800 proceeds to the block 840. If none of the conditions for ceasing the activated assist feature are satisfied, the process 800 proceeds to a decision block 845, and possibly from there back to the block 810 to continue executing the activated assist feature.

In the block 840, the computer 110, 126, 128 refrains from executing the activated assist feature. After the block 840, the process 800 proceeds to the decision block 845.

In the decision block 845, the computer 110, 126, 128 determines whether the first vehicle 100 is still on. If so, the process 800 returns to the block 810 to continue checking for assist features to execute. If the first vehicle 100 has been turned off, the process 800 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
    receive data indicating a lane change by a first vehicle that is towing a second vehicle, the data including data indicating a direction that first wheels of the first vehicle are turning while the first vehicle is performing the lane change;
    during the lane change, instruct a steering system of the second vehicle to turn second wheels of the second vehicle in a same direction as the first wheels; and
    during the lane change, refrain from instructing the steering system of the second vehicle to turn the second wheels in response to at least one of data indicating that the first vehicle is outside a geofenced area, a speed of the first vehicle being below a threshold speed, or failing to receive an input confirming the turning of the second wheels.

2. The computer of claim 1, wherein the instructions further include instructions to, during the lane change, refrain from instructing the steering system of the second vehicle to turn the second wheels in response to data indicating that the first vehicle is outside the geofenced area.

3. The computer of claim 2, wherein the geofenced area is a limited-access road.

4. The computer of claim 1, wherein the instructions further include instructions to, during the lane change, refrain from instructing the steering system of the second vehicle to turn the second wheels in response to the speed of the first vehicle being below the threshold speed.

5. The computer of claim 1, wherein the instructions further include instructions to, during the lane change, refrain from instructing the steering system of the second vehicle to turn the second wheels in response to failing to receive the input confirming the turning of the second wheels.

6. The computer of claim 1, wherein instructing the steering system of the second vehicle to turn the second wheels includes turning the second wheels to a second steering angle based on a first steering angle of the first wheels.

7. The computer of claim 6, wherein the second steering angle is a gain applied to the first steering angle.

8. The computer of claim 7, wherein the instructions further include instructions to receive an input setting the gain.

9. The computer of claim 1, wherein instructing the steering system of the second vehicle to turn the second wheels includes turning the second wheels to a second steering angle based on a relative angle between the first vehicle and the second vehicle.

10. The computer of claim 9, wherein instructing the steering system of the second vehicle to turn the second wheels includes applying a feedback loop minimizing a difference between a target angle and the relative angle between the first vehicle and the second vehicle.

11. The computer of claim 1, wherein the instructions further include instructions to, in response to a condition, instruct a propulsion of the second vehicle to accelerate the second vehicle.

12. The computer of claim 11, wherein the propulsion is a second propulsion, and the condition is at least one of a temperature of a first propulsion of the first vehicle being above a threshold temperature, a fuel level of the first vehicle being below a threshold fuel level, a charge level of the first vehicle being below a threshold charge level, the first vehicle ascending a grade, or the first vehicle passing a third vehicle.

13. The computer of claim 1, wherein the instructions further include instructions to, in response to the first vehicle descending a grade, instruct a propulsion of the second vehicle to downshift.

14. The computer of claim 1, wherein the instructions further include instructions to, in response to a first brake system of the first vehicle braking, instruct a second brake system of the second vehicle to brake.

15. The computer of claim 1, wherein the instructions further include instructions to:
    receive data indicating a parking maneuver by the first vehicle, the data including data indicating the direction that the first wheels are turning while the first vehicle is performing the parking maneuver; and
    during the parking maneuver, instruct the steering system to turn the second wheels in an opposite direction as the first wheels.

16. A computer comprising a processor and a memory storing instructions executable by the processor to: receive data indicating a parking maneuver by a first vehicle that is towing a second vehicle, the data including data indicating a direction that first wheels of the first vehicle are turning while the first vehicle is performing the parking maneuver;
    during the parking maneuver, lock a third wheel of the second vehicle to prevent spinning of the third wheel about an axle of the third wheel in response to receiving an input to lock the third wheel;
    during the parking maneuver, instruct a steering system of the second vehicle to turn second wheels of the second vehicle in an opposite direction as the first wheels, the second wheels being different than the third wheel; and
    during the parking maneuver, refrain from instructing the steering system of the second vehicle to turn the second wheels in response to failing to receive an input confirming the turning of the second wheels.

17. The computer of claim 16, wherein instructing the steering system of the second vehicle to turn the second wheels includes turning the second wheels to a second steering angle based on a first steering angle of the first wheels.

18. The computer of claim 17, wherein the second steering angle is a gain applied to the first steering angle.

19. A method comprising:
    receiving data indicating a lane change by a first vehicle that is towing a second vehicle, the data including data indicating a direction that first wheels of the first vehicle are turning while the first vehicle is performing the lane change;
    during the lane change, instruct a steering system of the second vehicle to turn second wheels of the second vehicle in a same direction as the first wheels; and
    during the lane change, refraining from instructing the steering system of the second vehicle to turn the second wheels in response to at least one of data indicating that the first vehicle is outside a geofenced area, a speed of the first vehicle being below a threshold speed, or failing to receive an input confirming the turning of the second wheels.

* * * * *